United States Patent
Lapiduz

(10) Patent No.: US 12,001,822 B2
(45) Date of Patent: Jun. 4, 2024

(54) MULTI-SIGNATURE VALIDATION OF DEPLOYMENT ARTIFACTS

(71) Applicant: Capital One Services, LLC, McLean, VA (US)

(72) Inventor: Diego Lapiduz, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/164,082

(22) Filed: Feb. 1, 2021

(65) Prior Publication Data

US 2022/0244932 A1     Aug. 4, 2022

(51) Int. Cl.
| | | |
|---|---|---|
| G06F 9/44 | (2018.01) | |
| G06F 8/60 | (2018.01) | |
| H04L 9/06 | (2006.01) | |
| H04L 9/32 | (2006.01) | |

(52) U.S. Cl.
CPC .............. *G06F 8/60* (2013.01); *H04L 9/0643* (2013.01); *H04L 9/3247* (2013.01)

(58) Field of Classification Search
CPC ........................................................ G06F 8/60
USPC ......................................................... 717/178
See application file for complete search history.

(56) References Cited

U.S. PATENT DOCUMENTS

| | | | | |
|---|---|---|---|---|
| 8,190,902 B2 * | 5/2012 | Lytle | ..................... | H04L 9/3247 |
| | | | | 713/176 |
| 8,762,959 B2 * | 6/2014 | Singonahalli | ....... | G06F 11/3688 |
| | | | | 717/124 |
| 9,641,491 B2 * | 5/2017 | Kaluzhny | ............. | H04L 9/0662 |
| 9,665,366 B2 * | 5/2017 | Kuchibhotla | ........... | H04W 4/60 |
| 9,853,817 B2 | 12/2017 | LaGrone et al. | | |
| 10,268,565 B2 * | 4/2019 | Agarwal | ............. | G06F 9/44589 |
| 10,397,255 B1 * | 8/2019 | Bhalotra | ............. | H04L 63/1425 |
| 10,521,447 B2 * | 12/2019 | Cahana | .................. | G06F 16/252 |
| 10,601,807 B2 | 3/2020 | Sweet et al. | | |
| 10,656,936 B2 * | 5/2020 | Robison | .................... | G06F 8/71 |
| 10,725,775 B2 * | 7/2020 | Suarez | ................. | G06F 9/45558 |
| 10,782,990 B1 * | 9/2020 | Suarez | ................. | G06F 11/301 |
| 10,951,544 B2 * | 3/2021 | Le | ......................... | H04L 49/555 |
| 11,139,982 B2 * | 10/2021 | Ramzan | ................ | H04L 9/3073 |
| 11,194,566 B1 * | 12/2021 | Gabrielson | ............... | G06F 8/65 |

(Continued)

FOREIGN PATENT DOCUMENTS

| | | | | |
|---|---|---|---|---|
| CN | 107688526 A | * | 2/2018 | .......... G06F 11/3452 |
| CN | 110069921 A | | 7/2019 | |

OTHER PUBLICATIONS

Docker Inc., docker docs, "Get started with Notary", Docker Documentation, https://docs.docker.com/notary/getting_started/, accessed Nov. 6, 2020 (4 pages).

*Primary Examiner* — Evral E Bodden
(74) *Attorney, Agent, or Firm* — Bookoff McAndrews, PLLC

(57) ABSTRACT

A computer-implemented method for validating a build artifact may include transmitting the build artifact to each of a plurality of validators. Each of the plurality of validators may be configured to: determine whether the build artifact meets a respective criterion; and in response to a determination that the build artifact meets the respective criterion, generate a respective digital signature associated with the build artifact. The method may further include: verifying each of the respective digital signatures and in response to verifying the respective digital signatures, deploying the build artifact.

20 Claims, 5 Drawing Sheets

(56) References Cited

U.S. PATENT DOCUMENTS

| | | | |
|---|---|---|---|
| 2013/0325824 A1* | 12/2013 | Shoens | G06F 16/16 |
| | | | 707/698 |
| 2014/0250427 A1* | 9/2014 | Wong | G06F 11/3664 |
| | | | 717/126 |
| 2016/0004522 A1* | 1/2016 | Connelly | G06F 9/45558 |
| | | | 717/176 |
| 2019/0235861 A1 | 8/2019 | Suarez et al. | |
| 2019/0319948 A1 | 10/2019 | Triola et al. | |
| 2021/0064417 A1* | 3/2021 | Jiang | H04L 43/50 |
| 2021/0377044 A1* | 12/2021 | Leibmann | H04L 9/0891 |
| 2022/0092193 A1* | 3/2022 | Nijasure | G06F 21/602 |

* cited by examiner

MULTI-SIGNATURE VALIDATION OF DEPLOYMENT ARTIFACTS

TECHNICAL FIELD

Various embodiments of the present disclosure relate generally to validation of software artifacts and more particularly to obtaining digital signatures for a software artifact from multiple validators and verifying each of the digital signatures before deployment.

BACKGROUND

Software development frequently occurs in a distributed manner in which individuals and teams may work remotely on, and be responsible for, different portions of a software development pipeline. Depending on the type of software being developed, various tests may need to be performed on any given build artifact before it is deployed. Several different validators may be used in the development pipeline to perform the requisite testing to determine if a build artifact meets a set of predetermined requirements.

Generally, when multiple validators are used in a distributed development environment, each validation must be verified before deployment. Serially querying each individual validator to verify that the build artifact has met a respective requirement, however, may require network resources and can result in substantial delay. Alternatively, if a single service is used as a notary to verify the testing performed by each validator and to verify that the build artifact meets the respective requirements, the single service may become a bottleneck for the deployment pipeline. Moreover, when a single service acts as a notary, the service may have to rely on each validator's application programming interface (API) and trust that the APIs are functioning properly.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for validating and verifying build artifacts.

In one example, an embodiment of a computer-implemented method for validating a build artifact may include: transmitting the build artifact to each of a plurality of validators, wherein each of the plurality of validators is configured to: determine whether the build artifact meets a respective criterion; and in response to a determination that the build artifact meets the respective criterion, generate a respective digital signature associated with the build artifact; verifying each of the respective digital signatures; and in response to verifying the respective digital signatures, deploying the build artifact.

In another example, an embodiment of a computer-implemented method for validating a build artifact may include: retrieving and storing a plurality of public keys; receiving the build artifact, the build artifact including a plurality of cryptographic signatures, each of the plurality of cryptographic signatures respectively corresponding to one of the plurality of public keys; verifying the plurality of cryptographic signatures using the corresponding public keys; and in response to verifying the plurality of cryptographic signatures, deploying the build artifact.

In yet another example, an embodiment of a system for validating a build artifact may include: a memory storing instructions and a database that includes the artifact; and a processor operatively connected to the memory and configured to execute the instructions to perform a plurality of operations, including: retrieving and storing a plurality of public keys; transmitting the build artifact to a plurality of validators, wherein each validator is configured to: apply a respective hash function to the build artifact to generate a respective hash value associated with the build artifact; determine whether the build artifact meets a respective criterion; and in response to a determination that the build artifact meets the respective criterion, generate a respective cryptographic signature based on the respective hash value, and add the respective cryptographic signature to the build artifact; verifying each of the respective cryptographic signatures; and in response to verifying the respective cryptographic signatures, deploying the build artifact.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
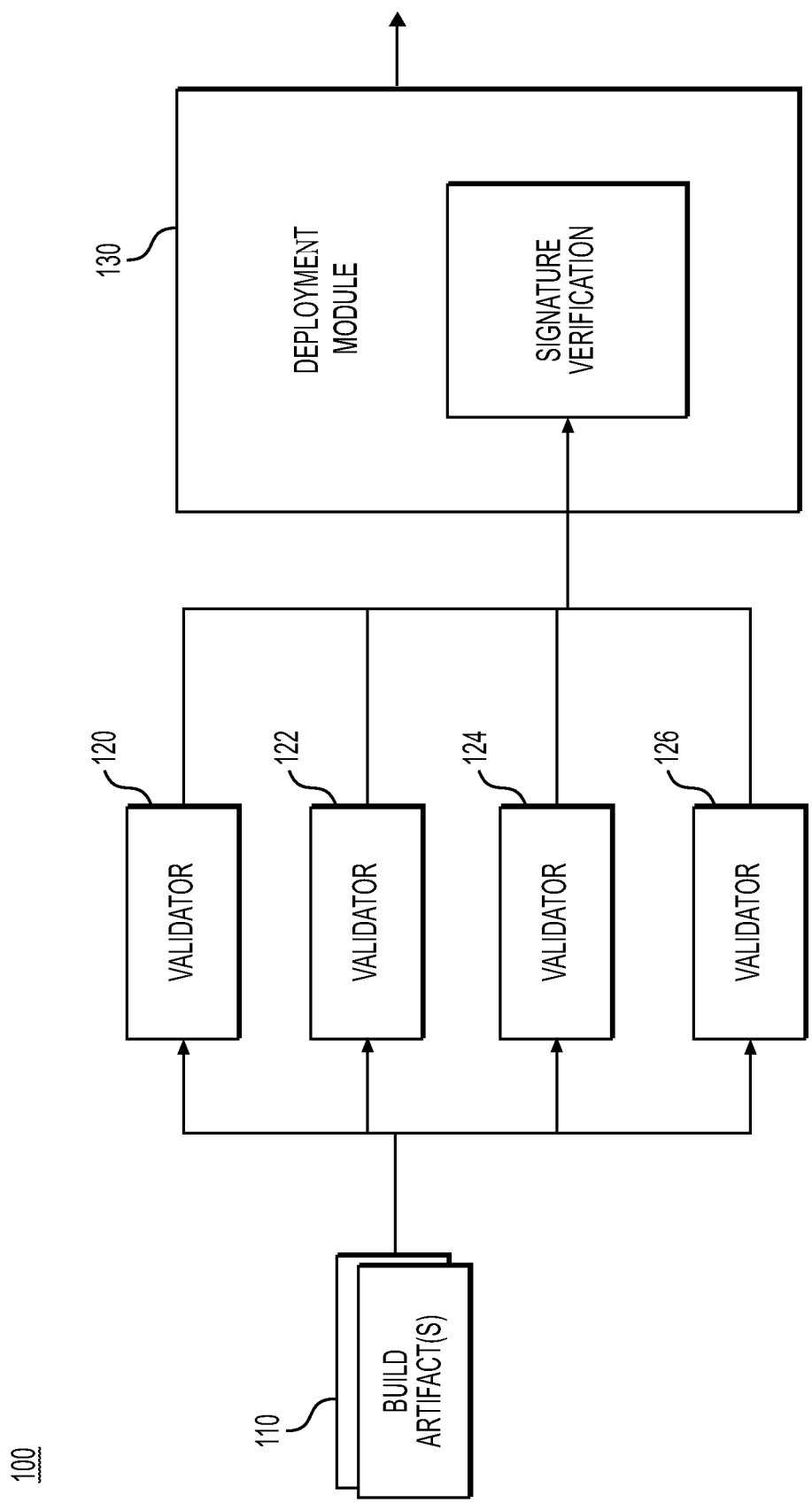
FIG. 1 depicts an exemplary process flow, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The terms "build artifact" or the like generally encompasses any product of software development, including but not limited to application containers, application packages, software packages, software images, documents, source code, data files, and object files. The term "validator" or the like generally encompasses any device or entity configured to scan or test a build artifact to determine whether it satisfies one or more criteria. The terms "deploy," "deployment," and the like generally encompass any of the activities that may make a build artifact available for use by a set of users, including but not limited to release, installation, activation, and update. The term "signature" generally encompasses a value, string, and sequence of characters, including those calculated by mathematical algorithm and those generated by cryptographic techniques.

In general, the present disclosure provides methods and systems for validating and verifying build artifacts for deployment, and relates particularly to using signatures for validating and verifying build artifacts. As will be discussed hereinafter in more detail, the methods and systems according to the present disclosure represent improvements over existing techniques.

Software development may occur in several stages that ultimately result in a build artifact being made available to a set of intended users, and/or being deployed. The stages of software development may include designing, building, testing, and deployment, among others. Each stage of the software development lifecycle may occur in a distributed fashion in which individuals, teams, or entities each cooperate to bring software to release and/or market. In doing so, participants in the software development process may use version control services such as GitHub repositories to store and track changes to source code, and Jenkins Pipeline to manage workflow.

At the testing stage of the software development lifecycle, several tests may need to be conducted on a build artifact after it has been designed and built and before it is deployed to a set of intended users. Such tests may include a test in which the build artifact is scanned for known vulnerabilities. Such tests may also include a compliance scan for compliance with corporate policies. Such tests may further include an open source legal compliance scan, a secrets filter, a smoke test, an end-to-end test, and/or an origin or source scan. It is to be understood, however, that the testing described herein is not limited to the tests listed, but rather could include any other types of tests including those customarily performed on build artifacts prior to deployment.

Due to the distributed nature of the software development lifecycle, the various tests conducted on a build artifact may each be conducted by a separate validation authority, or validator, responsible for ensuring that the build artifact satisfies a test criterion or test criteria. For example, one validator may be responsible for ensuring the build artifact has no known vulnerabilities while another validator may be responsible for ensuring the build artifact complies with a relevant set of corporate policies. It is desirable that each validator conduct its respective test and ensure that the relevant test criteria are met by the build artifact prior to deployment, as failure to do so may result in substantial harm to the owner of the build artifact, such as reputational damage, security breaches, and other types of harm.

In practice, verifying that each of the validators has conducted its respective test on a build artifact and that the build artifact has satisfied the requisite criteria before the build artifact is deployed may tend to be a process prone to bottlenecks and failures. For example, a testing sequence for a build artifact may involve transmitting the build artifact to a plurality of validators in a serial fashion. In this type of sequence, only a single test can be performed by a single validator at a time and the overall testing sequence can be slowed by a single validator among the plurality of validators in the sequence. As another example, when a build artifact is prepared for deployment, a deployment module may verify that the build artifact staged for deployment has indeed satisfied each of the requisite criteria. The deployment module may perform such verification by querying each validator serially via a network to determine if each validator has tested the build artifact and that the build artifact has satisfied the requisite criteria. The deployment module may query the validators based on a hash value for the build artifact staged for deployment. The foregoing verification sequence presents several drawbacks. For example, serially querying each validator may result in the verification sequence being slowed by a single validator among the plurality of validators. In another example, the verification sequence may rely on network communications between the deployment module and each of the validators, wherein such network communications may slow depending on bandwidth issues or fail entirely due to lack of connectivity. In a further example, such a verification sequence may rely on the respective application programming interface (API) for each of the validators to be functioning properly when the deployment module queries each of the validators. Accordingly, if there is a malfunction within the API of any of the validators, the build artifact may be deployed without actually satisfying the requisite criteria.

Accordingly, a need exists to address the foregoing challenges in the software development process, and specifically in the testing and deployment stages of that process. Embodiments of the present disclosure address one or more of these challenges.

FIG. 1 depicts a simplified functional block diagram of an exemplary process flow 100 according to some embodiments. Process flow 100 may utilize a repository or database storing one or more build artifact(s) 110, a plurality of validators, e.g., validators 120, 122, 124, and 126, and a deployment module 130, which may communicate with each other via an electronic network.

The artifact(s) 110 may be at a stage of the software development lifecycle prior to deployment. The build artifact(s) 110 may be any product generated by or during software development, and may be any of application containers, application packages, software packages, software images, documents, source code, data files, and object files.

Each of the plurality of validators 120, 122, 124, and 126 may be configured to perform a respective test on a given build artifact 110 to determine whether the build artifact 110 meets a respective criterion. Testing may include, for example, testing for known vulnerabilities, a scan for compliance with corporate policies, an open source legal compliance scan, a secrets filter, a smoke test, an end-to-end test, an origin or source scan, any other test, or any combination tests. The respective criterion may be set by, for example, an owner of the one or more build artifact(s) 110, an administrator responsible for quality or security for the one or more build artifact(s) 110, a regulator, etc. A respective criterion for a test for known vulnerabilities may be, for example, that the one or more build artifact(s) 110 exhibit no known vulnerabilities. A respective criterion for a scan for compliance with corporate policies may be, for example, that the one or more build artifact(s) 110 are compliant with one or more predetermined policies. A respective criterion for an open source legal compliance scan may be, for example, that deployment of the one or more build artifact(s) 110 would not violate any copyrights. A respective criterion for a secrets filter may be, for example, that the one or more build artifact(s) 110 do not include or incorporate trade secret subject matter. A respective criterion for a smoke test may be, for example, that one or more functions of the one or more build artifact(s) 110 can be performed without errors. A respective criterion for an end-to-end test may be, for example, that a user is able to use the one or more build artifact(s) 110 without errors. A respective criterion for an origin scan may be, for example, that the one or more build artifact(s) 110 include an identifier associating them with a predetermined source. In response to the testing verifying that the given artifact 110 satisfies the respective criterion, each of the plurality of validators 120, 122, 124, and 126 may be configured to generate a respective signature, as discussed in further detail below.

The deployment module 130 may be, or may be part of, a device that is distinct from each of the plurality of validators 120, 122, 124, and 126. The deployment module 130 may be configured to perform verification of signatures generated, respectively, by each of the plurality of validators 120, 122, 124, and 126. The deployment module 130 may be set to verify a particular set of signatures by the same entity that set the criteria tested for by the plurality of validators 120, 122, 124, and 126, such as, for example, an owner of the one or more build artifact(s) 110, an administrator responsible for quality or security for the one or more build artifact(s) 110, a regulator, etc.

In various embodiments, the electronic network may be a wide area network ("WAN"), a local area network ("LAN"), personal area network ("PAN"), or the like. In some embodiments, electronic network includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

In an exemplary use case, after the one or more build artifact(s) 110 are designed and built, the one or more build artifact(s) 110 may undergo various testing. For the testing, the one or more build artifact(s) 110 may be transmitted to each of the validators 120, 122, 124, and 126. In some embodiments, the one or more build artifact(s) 110 may be transmitted to each of the plurality of validators 120, 122, 124, and 126 in parallel, such that each of the plurality of validators 120, 122, 124, and 126 receives an identical copy of each of the one or more build artifact(s) 110.

When the one or more build artifact(s) 110 are transmitted to each of the plurality of validators 120, 122, 124, and 126, each of the plurality of validators 120, 122, 124, and 126 may conduct a respective test on the one or more build artifact(s) 110. For example, validator 120 may scan the one or more build artifact(s) 110 for known vulnerabilities, whereas validator 122 may scan the one or more build artifact(s) 110 for compliance with corporate policies, validator 124 may perform a smoke test on the one or more build artifact(s) 110, and validator 126 may perform an end-to-end test on the one or more build artifact(s) 110. However, it is to be understood that the plurality of validators 120, 122, 124, and 126 need not perform these exact tests and could instead perform different tests in various combinations, and additionally could perform more or fewer tests.

If the plurality of validators 120, 122, 124, and 126 determine, through the respective testing, that the one or more build artifact(s) 110 satisfy respective criteria, each of the plurality of validators 120, 122, 124, and 126 may generate a signature corresponding to the one or more build artifact(s) 110 to indicate that the one or more build artifact(s) 110 indeed satisfy the respective criteria. For example, if validator 120 scans the one or more build artifact(s) 110 for known vulnerabilities and determines that no known vulnerabilities are present in the one or more build artifact(s) 110, validator 120 may generate a signature corresponding to each of the one or more build artifact(s) 110 to indicate that no known vulnerabilities are present in each of the one or more build artifact(s) 110. Validators 122, 124, and 126 may each generate similar signatures corresponding to each of the one or more build artifact(s) 110 if each of the one or more build artifact(s) 110 satisfies the respective criteria that was tested.

After the plurality of validators 120, 122, 124, and 126 conduct the respective tests on the one or more build artifact(s) 110, the one or more build artifact(s) 110 may be transmitted from each of the plurality of validators 120, 122, 124, and 126 to the deployment module 130 for deployment. Upon receipt of the one or more build artifact(s) 110, the deployment module 130 may perform verification of each of the signatures generated, respectively, by each of the plurality of validators 120, 122, 124, and 126. In some embodiments, the deployment module 130 may perform verification of each of the signatures locally, i.e. without communicating with any of the plurality of validators 120, 122, 124, and 126. Verification of the signatures, including local verification, will be described in further detail hereinafter.

If the deployment module 130 verifies that a valid signature exists for each of the plurality of validators 120, 122, 124, and 126, the deployment module may deploy the one or more build artifact(s) 110. If, on the other hand, the deployment module 130 determines that any of the signatures are invalid, or that any of the one or more build artifact(s) 110 lack any of the expected signatures, the deployment module 130 may withhold one or more build artifact(s) 110 from deployment. The deployment module 130 may further cause a log entry to be created within a log indicating that verification of one or more signatures for the one or more build artifact(s) 110 has failed. The log may be maintained by the deployment module 130, the database that transmitted the one or more build artifact(s) 110 to the plurality of validators 120, 122, 124, and 126, or elsewhere.

By verifying each of the signatures generated by a respective one of the plurality of validators 120, 122, 124, and 126, the deployment module 130 can ascertain that the one or more build artifact(s) 110 staged for deployment have indeed been tested by a respective one of the plurality of validators 120, 122, 124, and 126 and that, according to the plurality of validators 120, 122, 124, and 126, the one or more build artifact(s) 110 satisfy the requisite criteria for deployment. The deployment module 130 can thereby determine in effect, with a high degree of certainty, that the one or more build artifact(s) 110 indeed satisfy the requisite criteria for deployment before deploying the one or more build artifact(s) 110.

Figure 2:
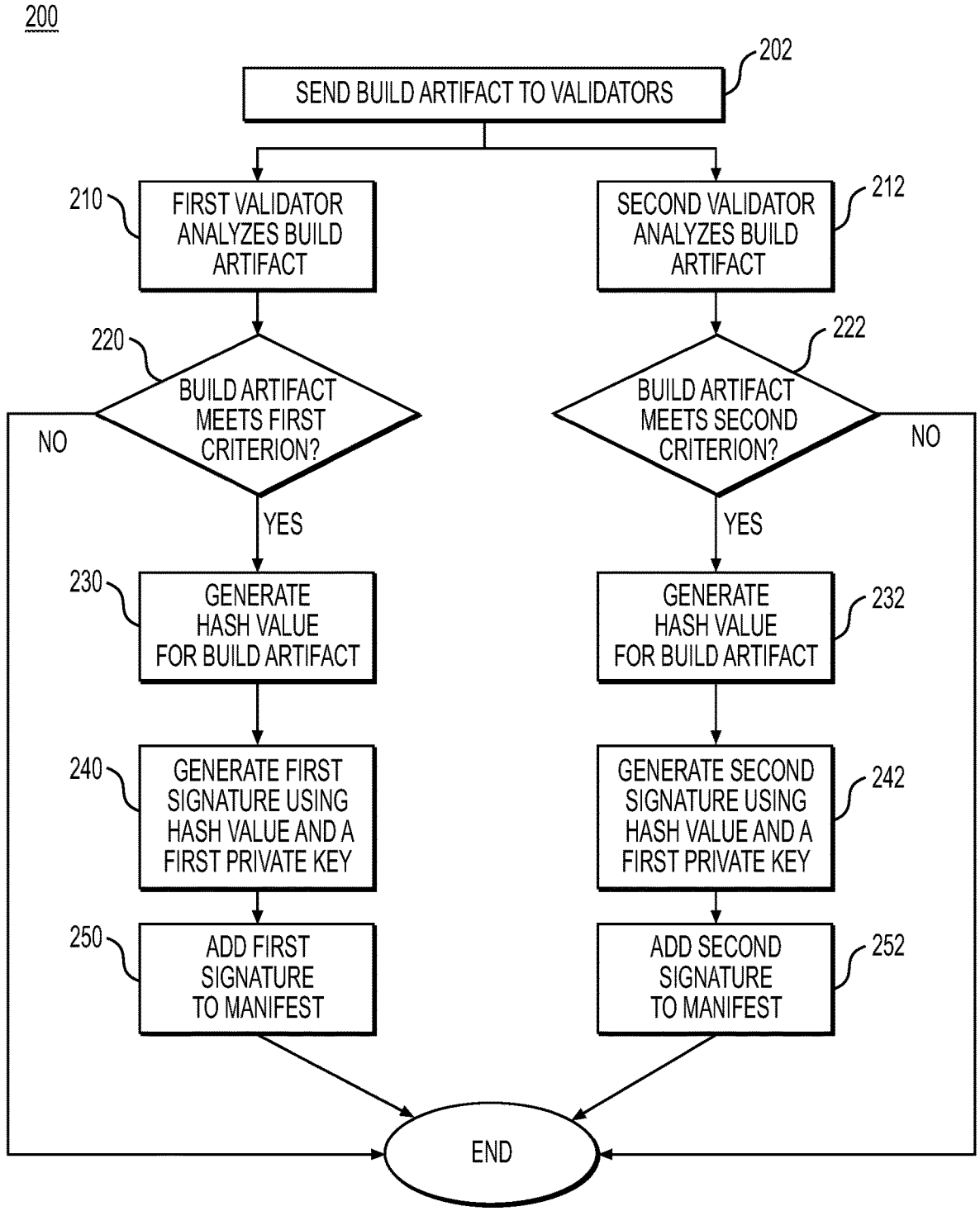
FIG. 2 depicts a flowchart of an exemplary method of transmitting a build artifact to multiple validators for testing, according to one or more embodiments.

FIG. 2 illustrates in further detail an exemplary process 200 for generating the signatures. For the sake of simplicity, FIG. 2 refers to a single build artifact, but it is to be understood one or more build artifact(s) may undergo validation and signature generation as described herein previously with respect to FIG. 1. Also for the sake of simplicity, FIG. 2 refers to a first validator and a second validator, but it is to be understood that a number of validators is not to be limited to two and instead may include any number of validators, including three, four, five, or more validators consistent with this disclosure. Moreover, it should be understood that this process 200 is an illustrative example only, and that in other embodiments, other processes according to this disclosure may include one or more additional operations, may omit one or more operations, and/or may perform operation in a different order.

At step 202, a build artifact may be transmitted to a first validator and a second validator such that the first validator and the second validator receive identical copies of the build artifact. The build artifact may be transmitted from a repository or database hosted on one or more servers, or from any other source. As will be described hereinafter, the first validator may perform additional steps. In parallel with steps performed by the first validator, a similar set of steps may be performed by the second validator. It is to be understood that the steps performed respectively by the first validator and the second validator need not be performed simultaneously or at any predetermined time intervals. In some embodiments, the first validator and the second validator may be selected for transmission of the build artifact based on criteria preset for the build artifact.

For instance, the build artifact may be associated with a first criterion and a second criterion. The first validator may be specifically configured to test for a first criterion, and the second validator may be specifically configured to test for a second criterion, and thus the first and second validators may be selected accordingly for transmission of the build artifact. For example, if the first criterion is that no known vulnerabilities are present in the build artifact, the first validator may be specifically configured for testing the build artifact for known vulnerabilities and designated to receive the build artifact accordingly. As another example, if the second criterion is that the build artifact is compliant with relevant corporate policies, the second validator may be specifically configured for scanning the build artifact for compliance with corporate policies, and designated to receive the build artifact accordingly.

After the first validator has received the build artifact, at step 210, the first validator may analyze, and/or conduct a test on the build artifact. As described herein previously, the analysis performed by the first validator may include testing for known vulnerabilities, a scan for compliance with corporate policies, an open source legal compliance scan, a secrets filter, a smoke test, an end-to-end test, an origin or source scan, or other tests.

At step 220, the first validator may determine whether the build artifact meets the first criterion. The first criterion may be predetermined as described herein previously.

If at step 220 the first validator determines that the build artifact does not meet the first criterion, no signature may be added to a manifest of the build artifact and the process may end with respect to the first validator. If, on the other hand, at step 220 the first validator determines that the build artifact does meet the first criterion, the process with respect to the first validator may proceed to step 230. At step 230, the first validator may generate a hash value corresponding to the build artifact. The first validator may generate the hash value using any known hash function or may use a unique hash function. By generating the hash value, the first validator is able to, in effect, create a record of the build artifact exactly as it exists, at the bit level, when the first validator determines that it meets the first criterion.

At step 240, the first validator may generate a first signature corresponding to the build artifact. The first signature may be a digital signature and, more specifically, may be a cryptographic signature. The first validator may generate the first signature using the hash value and a first private key. The first validator may generate the first signature using known cryptographic methods, including public key cryptography. By generating the first signature in this manner, the first signature may be unique to the build artifact as it exists when the first validator determines that it meets the first criterion.

Then, at step 250, the first validator may add the first signature to a manifest corresponding to the build artifact. After step 250, the process may end with respect to the first validator.

In parallel with steps 210, 220, 230, 240, and 250 performed by the first validator, a similar set of steps 212, 222, 232, 242, and 252 may be performed by the second validator. It is to be understood, however, that steps 210, 220, 230, 240, and 250 need not be performed at the exact same time as any of steps 212, 222, 232, 242, and 252.

After the second validator has received the build artifact, at step 212, the second validator may analyze, and/or conduct a test on, the build artifact. As described herein previously, the analysis performed by the second validator may include testing for known vulnerabilities, a scan for compliance with corporate policies, an open source legal compliance scan, a secrets filter, a smoke test, an end-to-end test, an origin or source scan, or other tests.

At step 222, the second validator may determine whether the build artifact meets the second criterion. The second criterion may be predetermined as described herein previously.

If at step 222 the second validator determines that the build artifact does not meet the second criterion, no signature may be added to a manifest of the build artifact and the process may end with respect to the second validator. If, on the other hand, at step 222 the second validator determines that the build artifact does meet the second criterion, the process with respect to the second validator may proceed to step 232. At step 232, the second validator may generate a hash value corresponding to the build artifact. The second validator may generate the hash value using any known hash function or may use a unique hash function. Similar to generation of the hash value by the first validator, the second validator is able to in effect create a record of the build artifact exactly as it exists, at the bit level, when the second validator determines that it meets the first criterion.

At step 242, the second validator may generate a second signature corresponding to the build artifact. The second signature may be a digital signature and, more specifically, may be a cryptographic signature. The second validator may generate the second signature using the hash value and a second private key. The second validator may generate the second signature using known cryptographic methods, including public key cryptography. By generating the second signature in this manner, the second signature may be unique to the build artifact as it exists when the second validator determines that it meets the second criterion.

Then, at step 252, the second validator may add the first signature to a manifest corresponding to the build artifact. After step 252, the process may end with respect to the second validator. If the process 200 proceeds to both of steps 250 and 252, the first signature and the second signature may be collected and/or compiled in the manifest corresponding to the build artifact. The manifest may further include a hash value corresponding to the build artifact, where the hash value may indicate that the manifest is associated with the build artifact. As discussed herein previously, it is to be understood that any number of validators may be involved in process 200 and that any additional validators may perform steps similar to those performed by the first validator and the second validator. It is to be further understood that any additional validators may perform those similar steps in parallel with the steps performed by the first validator and the second validator. If additional validators are involved in process 200, the first signature, the second signature, and any additional signatures generated by any additional validators may be collected and compiled in the manifest corresponding to the build artifact.

Figure 3:
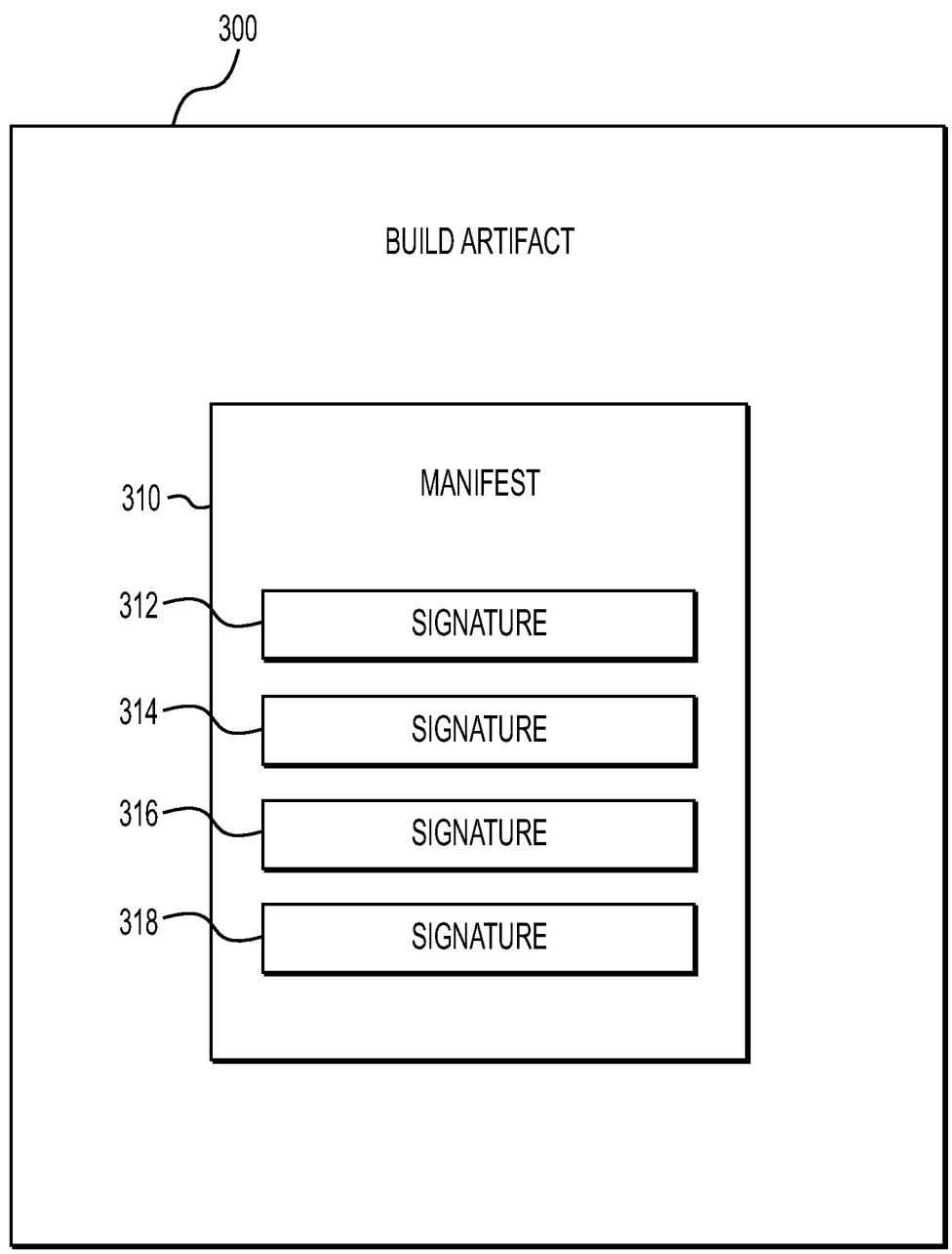
FIG. 3 depicts a block diagram of a build artifact having a manifest of signatures, according to one or more embodiments.
Figure 4:
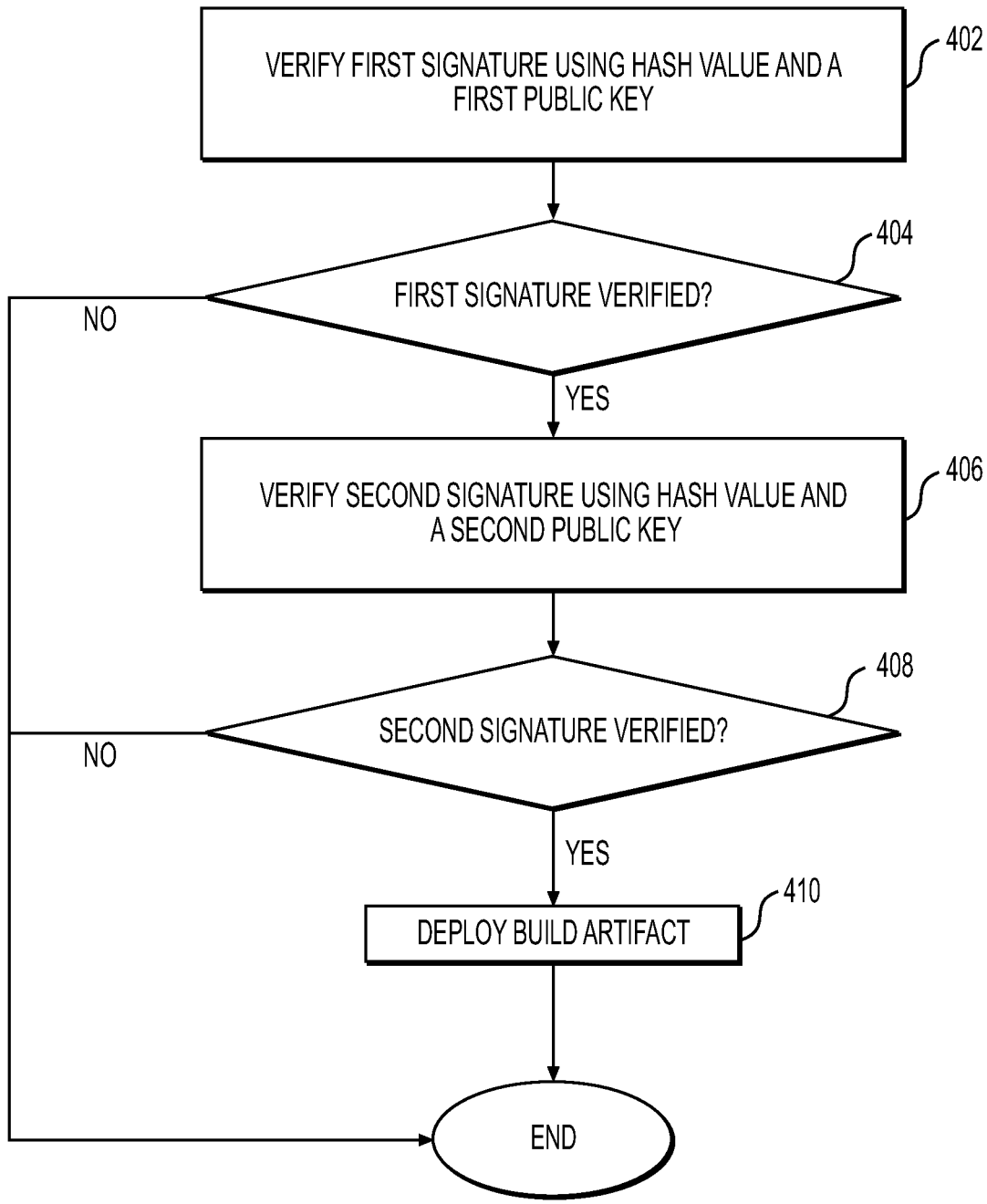
FIG. 4 depicts a flowchart of an exemplary method of verifying multiple signatures for a build artifact, according to one or more embodiments.

FIG. 3 depicts a functional block diagram of a build artifact 300 that may have undergone a process such as process 200. Manifest 310 may be associated with the build artifact 300 and may include metadata associated with the build artifact 300. Manifest 310 may further include a plurality of signatures 312, 314, 316, and 318, where a number of signatures included in the manifest may correspond to a number of validators to which the build artifact 310 has been transmitted and which have performed respective tests on the build artifact 310. For example, each of the plurality of signatures 312, 314, 316, and 318 may correspond to one of four validators to which the build artifact 310 has been transmitted, for example, any four of the plurality of validators 120, 122, 124, and 126 depicted in FIG. 1. Signature 312 may indicate that build artifact 310 has satisfied a first criterion, signature 314 may indicate that build artifact 310 has satisfied a second criterion, signature 316 may indicate that build artifact 310 has satisfied a third criterion, and signature 318 may indicate that build artifact 310 has satisfied a fourth criterion FIG. 4 depicts an exemplary process 400 for verifying signatures associated with a build artifact. Process 400 may be performed by a deployment module, such as deployment module 130, as described herein previously with respect to FIG. 1. Process 400 may be performed upon transmission of the build artifact to deployment module 130 for deployment. For the sake of simplicity, FIG. 4 depicts verification of two signatures. However, it is to be understood that a process involving verification of more than two signatures is contemplated by the present disclosure and that process 400 could be modified to involve verification of more than two signatures.

At step 402, the deployment module may verify a first signature included in a manifest of the build artifact using a hash value and a first public key. The first signature may be associated with the build artifact and generated and included in a manifest according to a process as described herein previously with respect to FIG. 2. As part of the verification, the deployment module may generate the hash value using a hash function on the build artifact. The deployment module may retrieve the first public key and may decrypt the first signature using the first public key, yielding a first string. The deployment module may verify the first public key with a corresponding certificate authority. The deployment module may then compare the hash value to the first string. If the hash value matches the first string, the first signature may be successfully verified. If the hash value does not match the first string, that may indicate that the first signature was generated by an entity other than a trusted validator or it may indicate that the build artifact has been modified in the interval between generation of the first signature and verification of the first signature. Therefore, if the hash value does not match the first string, the first signature may not be verified. At step 404, if the first signature is not verified, the process 400 may end and the deployment module may prohibit deployment of the build artifact. Alternatively, the build artifact may simply not deploy from the deployment module. At step 404, if the first signature is verified, the process 400 may proceed to step 406.

At step 406, the deployment module may verify a second signature included in a manifest of the build artifact using the hash value and a second public key. The second signature may be associated with the build artifact and generated according to a process as described herein previously with respect to FIG. 2. The deployment module may retrieve the second public key and may decrypt the second signature using a second public key, yielding a second string. The deployment module may verify the second public key with a corresponding certificate authority. The deployment module may then compare the hash value to the second string. If the hash value matches the second string, the second signature may be successfully verified. If the hash value does not match the second string, that may indicate that the second signature was generated by an entity other than a trusted validator or it may indicate that the build artifact has been modified in the interval between generation of the second signature and verification of the second signature. Therefore, if the hash value does not match the second string, the first signature may not be verified. At step 408, if the second signature is not verified, the process 400 may end and the deployment module may prohibit deployment of the build module. Alternatively, the build artifact simply may not deploy from the deployment module. At step 404, if the second signature is verified, the process 400 may proceed to step 410. At step 410, the build artifact may be deployed.

It is to be understood that steps 402 and 404 relating to the first signature need not occur sequentially before steps 406 and 408 relating to the second signature. Moreover, it is to be understood that steps 402 and 404 could be performed in parallel with steps 406 and 408, depending on the capabilities of the deployment module.

By performing validation, as described herein previously with respect to FIG. 2, and verification, as described herein previously with respect to FIG. 4, on a build artifact prior to deployment, an overall process by which the build artifact is determined to be genuine and compliant with all relevant criteria may be significantly improved. For example, by transmitting a build artifact to multiple validators in parallel, sequential operations by the multiple validators can be avoided. Accordingly, potential bottlenecks in the software development pipeline may be avoided because one or more validators need not necessarily prevent other validators from performing respective testing operations on the build artifact.

Additionally, by generating signatures using hash values and private keys at the validators, and verifying the signatures using hash values and public keys (which may themselves be verified with corresponding certificate authorities) at the deployment module, a need for many network communications between the deployment module and the validators may be obviated. Specifically, when the deployment module receives the build artifact, it need not query each validator over a network individually to request confirmation that the build artifact meets a respective criterion. Rather, the deployment module may verify the signatures asynchronously, including using public key cryptographic techniques. For example, steps 402, 404, 406, and 408, as described above, may be performed by the deployment module while the deployment module is in an offline state.

Such a system may exhibit one or more benefits over conventional solutions. For example, validators may be removed from the process of verifying signatures by the deployment module, such that the potential for interruption by a technical failure, e.g. an outage or connectivity issue, of a validator is eliminated. In another example, the deployment module need not rely on respective APIs of the validators to determine whether the build artifact meets the requisite criteria, thereby eliminating a potential point of failure. In a further example, by eliminating the need for the deployment module to query each validator and receive a response via a network, the potential for a bad actor to intercept and compromise those network communications is eliminated. In another example, network resources may be conserved and, as a result, cost may be reduced. In an additional example, verification by the deployment module may occur more rapidly as the deployment module need not wait for responses from each validator. Furthermore, by generating and verifying signatures as described herein, build artifacts can be deployed with a high degree of certainty that they are genuine and satisfy the requisite criteria. This list is not intended to be exhaustive and additional and/or alternative benefits of the embodiments described herein may exist.

Further aspects of the disclosure are discussed in the additional embodiments below. It should be understood that embodiments in this disclosure are exemplary only, and that other embodiments may include various combinations of features from other embodiments, as well as additional or fewer features.

In general, any process discussed in this disclosure that is understood to be computer-implementable, such as the processes illustrated in FIGS. 2 and 4, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
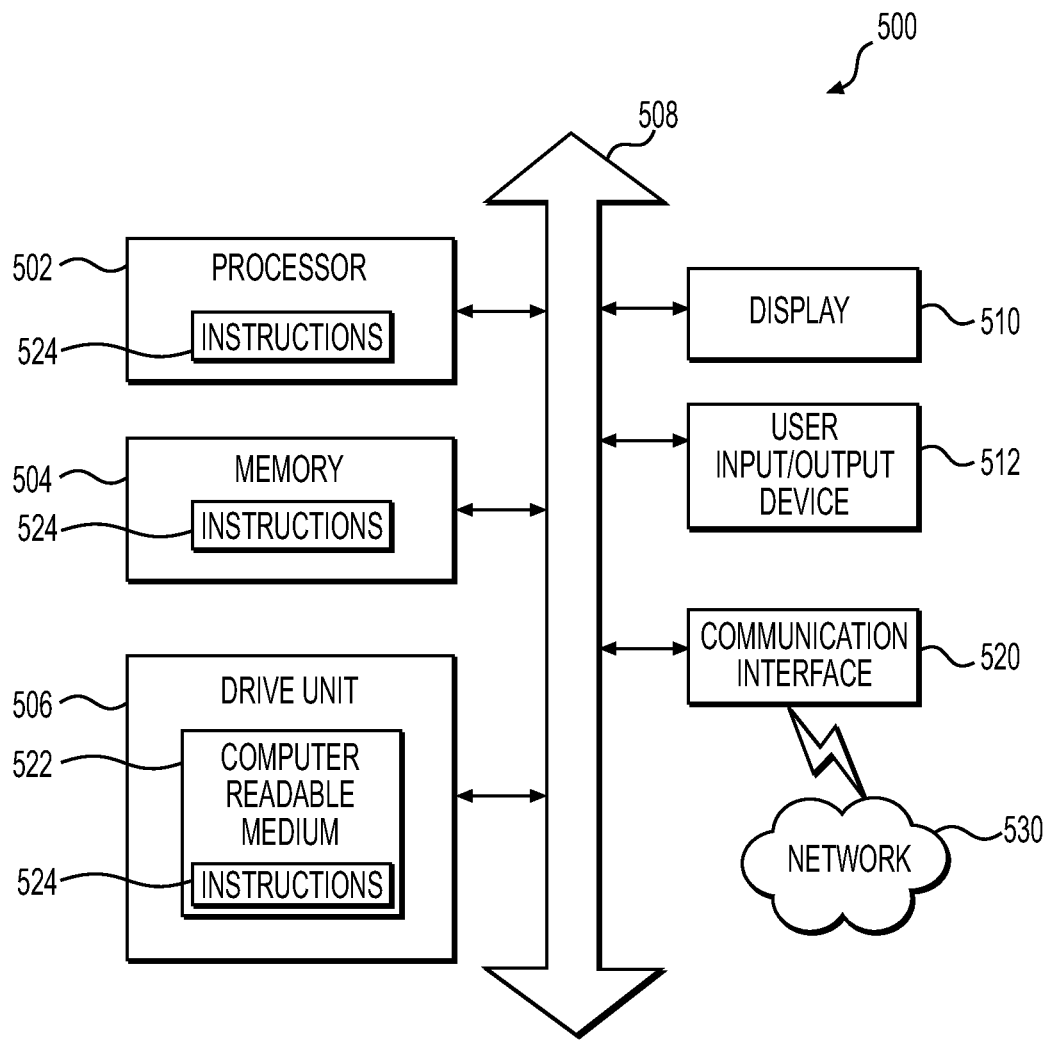
FIG. 5 depicts an example of a computing device, according to one or more embodiments.

FIG. 5 is a simplified functional block diagram of a computer system 500 that may be configured as a device for executing the processes of FIGS. 2 and 4, according to exemplary embodiments of the present disclosure. FIG. 5 is a simplified functional block diagram of a computer that may be configured to serve as any of the validators 120, 122, 124, 126, or the deployment module 130, according to exemplary embodiments of the present disclosure. In various embodiments, any of the systems herein may be an assembly of hardware including, for example, a data communication interface 520 for packet data communication. The platform also may include a central processing unit ("CPU") 502, in the form of one or more processors, for executing program instructions. The platform may include an internal communication bus 508, and a storage unit 506 (such as read-only memory ("ROM"), hard disk drive ("HDD"), solid state drive ("SSD"), etc.) that may store data on a computer readable medium 522, although the system 500 may receive programming and data via network communications including via network 530. The system 500 may also have a memory 504 (such as random access memory ("RAM")) storing instructions 524 for executing techniques presented herein, although the instructions 524 may be stored temporarily or permanently within other modules of system 500 (e.g., processor 502 and/or computer readable medium 522). The system 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to validating and verifying build artifacts for deployment, it should be appreciated that the presently disclosed embodiments may be applicable to validating and verifying build artifacts and/or other data for any other purpose, such as evaluating build artifacts that have already been deployed, transaction security, etc.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes depicted in FIGS. 2 and 4 and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for validating a build artifact, the method comprising:
   transmitting an identical copy of the build artifact to each of a plurality of validators in parallel via a network;
   determining, by a first validator of the plurality of validators, whether the build artifact meets a first criterion;
   generating, by the first validator in response to a determination that the build artifact meets the first criterion, a first digital signature associated with the build artifact and adding the first digital signature to a manifest;
   determining, by a second validator of the plurality of validators, whether the build artifact meets a second criterion;
   generating, by the second validator in response to a determination that the build artifact meets the second criterion, a second digital signature associated with the build artifact and adding the second digital signature to the manifest;
   verifying each of the first and second digital signatures; and
   in response to verifying the first and second digital signatures, deploying the build artifact.

2. The method of claim 1, wherein:
   each of the respective digital signatures is a cryptographic signature.

3. The method of claim 2, wherein:
   the first validator generates the first digital signature using a first private key; and
   verifying the first digital signature further comprises using a first public key to decrypt the first digital signature.

4. The method of claim 3, further comprising:
   generating, by the first validator, a first hash value corresponding to the build artifact;
   wherein the first digital signature is generated using the first private key and the first hash value.

5. The method of claim 1, wherein:
   the plurality of validators includes at least three validators.

6. The method of claim 5, further comprising:
   the plurality of validators includes at least four validators.

7. The method of claim 1, further comprising:
   scanning, by the first validator, the build artifact for known vulnerabilities; and
   wherein the first criterion is based on an existence of one or more of the known vulnerabilities in the build artifact.

8. The method of claim 1, wherein the first criterion is generation of the build artifact by a predetermined source.

9. The method of claim 1, further comprising:
scanning, by the first validator, the build artifact for compliance with legal regulations; and
the first criterion is based on compliance of the build artifact with one or more legal regulations.

10. The method of claim 1, wherein the plurality of validators are each configured to generate the respective digital signatures in parallel and add the respective digital signatures to the manifest.

11. The method of claim 1, wherein:
verifying each of the respective digital signatures is performed by a deployment module, the deployment module being distinct from each of the plurality of validators and configured to perform the verifying without communicating with one or more of the plurality of validators.

12. The method of claim 1 wherein the build artifact is an application container.

13. A system for validating a build artifact, comprising:
a memory storing instructions and a database that includes the build artifact; and
a processor operatively connected to the memory and configured to execute the instructions to:
retrieve and store a plurality of public keys;
transmit an identical copy of the build artifact to each of a plurality of validators in parallel via a network;
a first validator configured to:
determine whether the build artifact meets a first criterion; and
generate, in response to a determination the build artifact meets the first criterion, a first cryptographic signature and add the first cryptographic signature to a manifest associated with the build artifact; and
a second validator configured to:
determine whether the build artifact meets a second criterion; and
generate, in response to a determination the build artifact meets the second criterion, a second cryptographic signature and add the second cryptographic signature to the manifest;
wherein the processor is further configured to:
receive the manifest, wherein the manifest includes the first cryptographic signature and the second cryptographic signature;
verify the first cryptographic signature and the second cryptographic signature; and
in response to verifying first cryptographic signature and the second cryptographic signature, deploy the build artifact.

14. The system of claim 13, wherein the first validator is configured to generate the first cryptographic signature using a first private key; and
the processor is configured to verify the first cryptographic signature using a first public key corresponding to the first private key to decrypt the first cryptographic signature.

15. The system of claim 14, wherein the first validator is further configured to generate a first hash value corresponding to the build artifact.

16. The system of claim 15, wherein the first validator is configured to generate the first cryptographic signature using the first hash value.

17. The system of claim 13, wherein the first validator is further configured to:
scan the build artifact for known vulnerabilities, and
wherein the first criterion is based on an existence of one or more of the known vulnerabilities in the build artifact.

18. The system of claim 17, wherein the second validator is further configured to:
scan the build artifact for compliance with legal regulations, and
wherein the second criterion is based on compliance of the build artifact with one or more legal regulations.

19. The system of claim 13, wherein the first criterion is generation of the build artifact by a predetermined source.

20. The system of claim 13, wherein the first and second validators are configured to generate the respective cryptographic signatures in parallel.

* * * * *